United States Patent [19]

Avens et al.

[11] Patent Number: 5,538,701

[45] Date of Patent: Jul. 23, 1996

[54] PROCESS TO REMOVE ACTINIDES FROM SOIL USING MAGNETIC SEPARATION

[75] Inventors: Larry R. Avens; Dallas D. Hill; F. Coyne Prenger, all of Los Alamos; Walter F. Stewart, Las Cruces; Thomas L. Tolt; Laura A. Worl, both of Los Alamos, all of N.M.

[73] Assignee: The Regents of the University of California, Office of Technology Transfer, Alameda, Calif.

[21] Appl. No.: 203,978

[22] Filed: Feb. 28, 1994

[51] Int. Cl.⁶ ..................................................... C01G 57/00
[52] U.S. Cl. ........................................ 423/3; 588/1; 209/8
[58] Field of Search .................. 588/1; 209/8, 39, 209/214; 423/11, 3

[56] References Cited

U.S. PATENT DOCUMENTS

| | | | |
|---|---|---|---|
| 4,067,953 | 1/1978 | Roux et al. | 423/80 |
| 4,738,799 | 4/1988 | Troy | 252/633 |
| 5,051,165 | 9/1991 | Andrews | 209/166 |
| 5,128,008 | 7/1992 | Lahoda et al. | 252/626 |
| 5,268,128 | 12/1993 | Lahoda et al. | 252/626 |
| 5,322,644 | 6/1994 | Dunn et al. | 252/626 |

*Primary Examiner*—Ngoclan Mai
*Attorney, Agent, or Firm*—Bruce H. Cottrell

[57] ABSTRACT

A process of separating actinide-containing components from an admixture including forming a slurry including actinide-containing components within an admixture, said slurry including a dispersion-promoting surfactant, adjusting the pH of the slurry to within a desired range, and, passing said slurry through a pretreated matrix material, said matrix material adapted to generate high magnetic field gradients upon the application of a strong magnetic field exceeding about 0.1 Tesla whereupon a portion of said actinide-containing components are separated from said slurry and remain adhered upon said matrix material is provided.

10 Claims, 2 Drawing Sheets

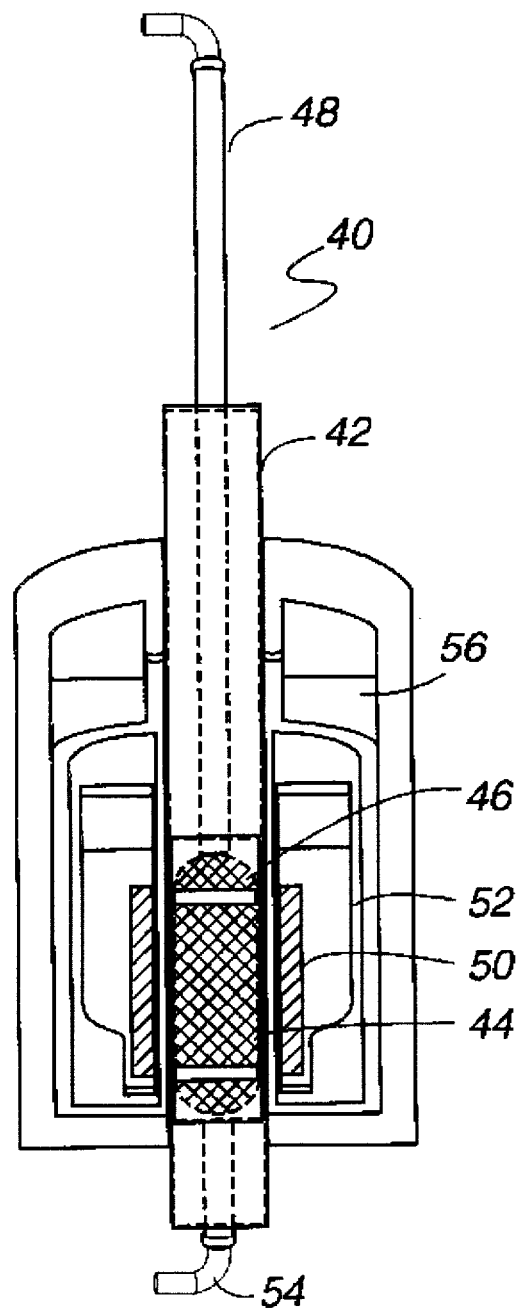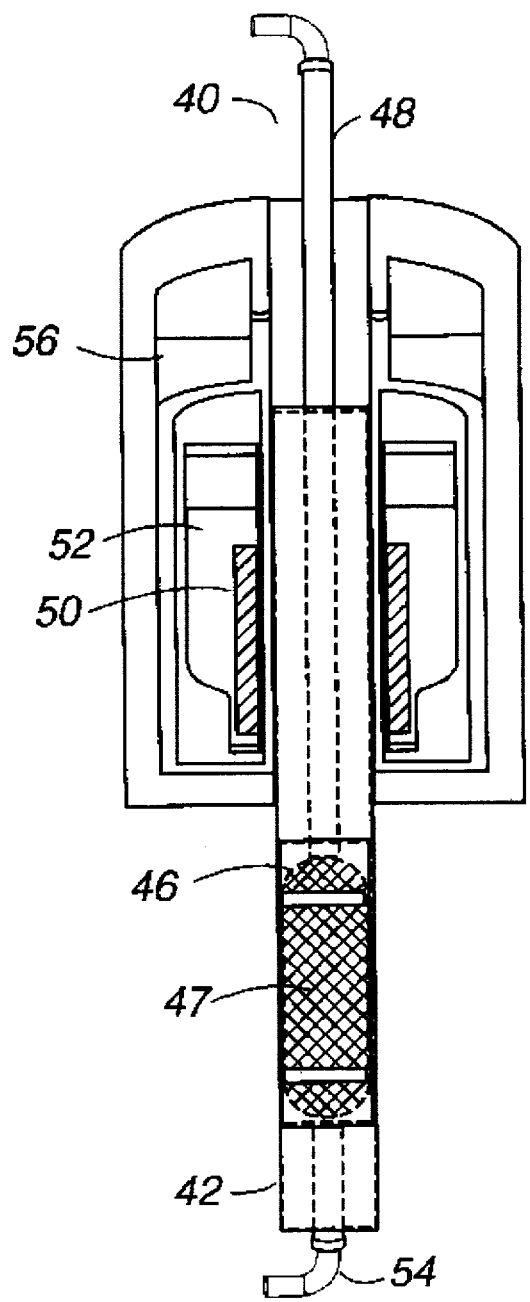
Fig.2a
Fig.2b

PROCESS TO REMOVE ACTINIDES FROM SOIL USING MAGNETIC SEPARATION

FIELD OF THE INVENTION

The present invention relates to magnetic separation and more particularly to the magnetic separation of actinides such as plutonium from soil or other admixtures such as sludges or underground storage tank wastes. This invention is the result of a contract with the Department of Energy (Contract No. W-7405-ENG-3).

BACKGROUND OF THE INVENTION

Soil containing radioactive materials such as uranium, plutonium and various fission products requires expensive cleanup and remediation. Such cleanup and remediation can involve the use of both physical and chemical separation methods. For example, U.S. Pat. No. 5,205,999 describes a chemical process for the treatment of soil contaminated with plutonium where the contaminated soil is contacted with an aqueous solution including carbonated water, a conditioning agent and a complexing agent, i.e., the anion of a carboxylic acid having from 2 to 6 carbon atoms.

In addition to contaminated soils, large quantities of sludges and storage tank wastes, e.g., underground storage tank wastes, containing actinide components exist. Separation of the actinide-containing components from either soil, sludge or storage tank waste could substantially reduce disposal costs.

Magnetic separation of actinides has been previously examined. For example, the use of a rare earth permanent magnet roll separator and an open gradient magnetic separator on samples with particle sizes of nominally greater than about 50 microns for separation of plutonium particles was described by Avens et al., "Magnetic Separation as a Plutonium Residue Enrichment Process" Separation Science and Technology, 25(13–15), 1967–1969 (1990). Such conventional dry magnetic separation techniques cannot be applied to samples with particle sizes of less than about 50 microns due to electrostatic forces. Despite previous efforts in cleanup of soil containing radioactive materials, the need for effective, economical processes remains.

It is an object of the present invention to provide a process for the removal of actinide-containing components, e.g., actinide metals, from, e.g., soil, and particularly a process for the removal of actinide-containing components, e.g., actinide metals from, e.g., soil mixtures with particle sizes less than about 50 microns.

It is a further object of the invention to provide a process for the removal of actinide-containing components, e.g., actinide metals, from, e.g., soil, employing magnetic separation of the actinide-containing components, e.g., actinide metals.

Still a further object of the present invention is to provide an apparatus for removal of actinide-containing components, e.g., actinide metals, from, e.g., soil.

SUMMARY OF THE INVENTION

To achieve the foregoing and other objects, and in accordance with the purposes of the present invention, as embodied and broadly described herein, the present invention provides a process of separating actinide-containing components from an admixture including forming a slurry including actinide-containing components within an admixture, said slurry including a dispersion-promoting surfactant, adjusting the pH of said slurry to within a desired range, and, passing said slurry through a pretreated matrix material, said matrix material adapted to generate high magnetic field gradients upon the application of a strong magnetic field exceeding about 0.1 Tesla whereupon a portion of said actinide-containing components are separated from said slurry and remain adhered upon said matrix material.

BRIEF DESCRIPTION OF THE DRAWINGS

FIGS. 2(a) and 2(b) are schematic drawings of a canister system for use in the magnetic separation of the present invention with the canister within the magnetic field in 2(a) and out of the magnetic field in 2(b).

DETAILED DESCRIPTION

Figure 1:
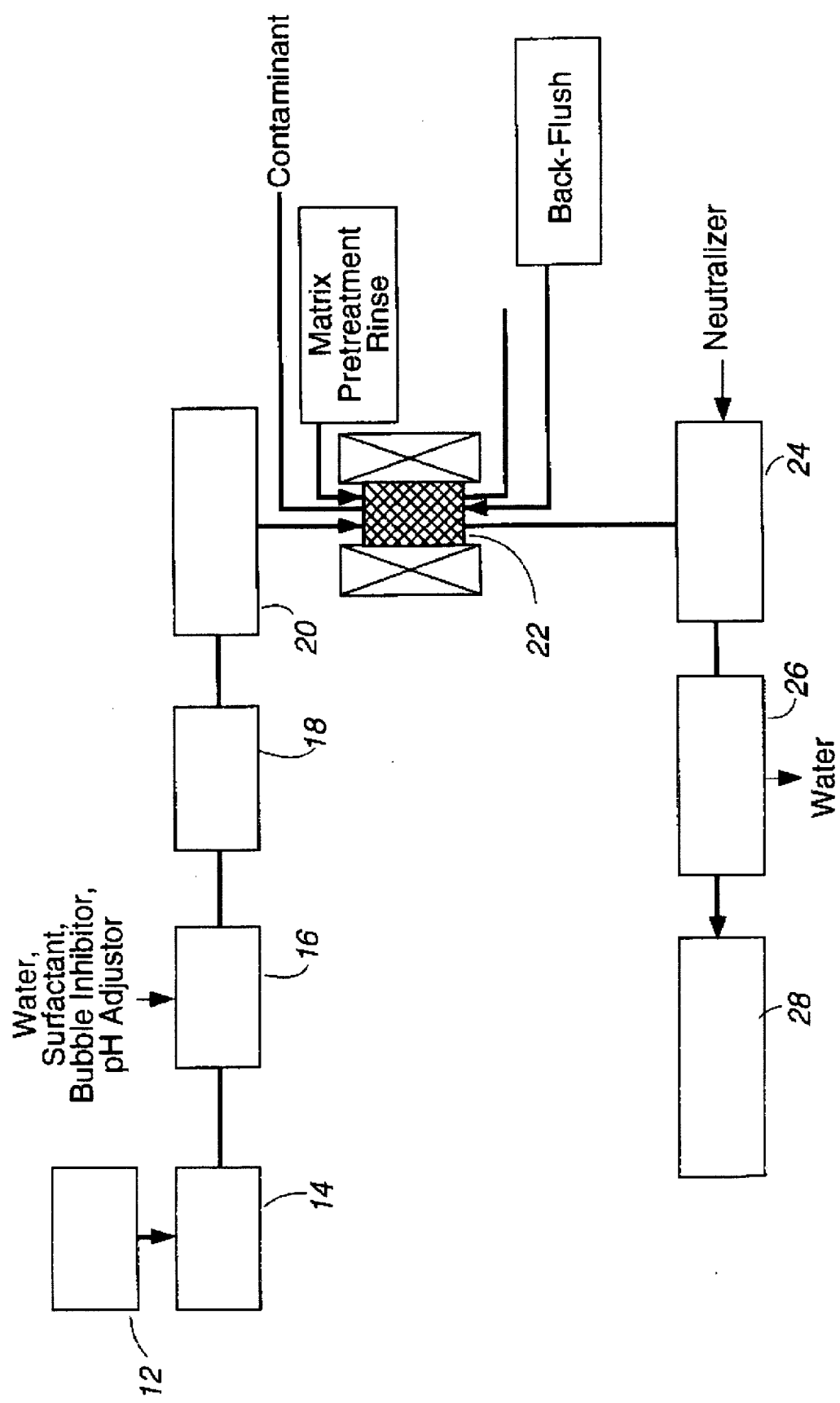
FIG. 1 is a block diagram of the process for removal of actinides from soil by magnetic separation.

The present invention is concerned with magnetic separation of actinide-containing components, e.g., actinide metal and actinide compounds, from soil or other admixtures such as underground storage tank wastes. Depending upon whether the actinide-containing component is in soil, sludge or another type admixture, the parameters of separation may be somewhat modified. Basically, the separation process involves forming a slurry including the actinide-containing component and passing the slurry through a matrix material subjected to a strong magnetic field. Additionally, the process may involve the use within the slurry of particular dispersion-promoting surfactants, optional antifoaming agents, e.g., surfactants, and sufficient acid or base to comminution generate a desired pH range. Also, the process may involve subjecting the slurry to, e.g., a sonication or attrition scrub, to reduce agglomeration of a soil mixture, may involve passing a slurry by a low field magnet to separate a portion, preferably a substantial portion of highly magnetic material within the slurry prior to passage through the matrix material subjected to the strong magnetic field, or may involve grinding, e.g., a soil composition to obtain particle sizes predominantly in the 0.1 to 100 micron range, more preferably in the 0.1 to 50 micron range.

FIG. 1 illustrates a process of the present invention for magnetic separation of actinides from soil. Contaminated soil 12 is passed through a grinder 14 and then sufficient water, surfactant, optional de-foamer, and a pH-adjusting material, e.g., a base or acid, are added to form a slurry 16. Slurry 16 is then comminuted 18, e.g., sonicated, to reduce agglomerations of soil within slurry 16 and a ferromagnetic scalper 20, i.e., a low strength magnet, is used to separate out highly magnetic components such as iron from the slurry. The slurry is then passed through the canister 22 containing the matrix material and subjected to the high strength magnet. By back-flushing the separated actinide materials are removed from the matrix material. The remaining slurry is then reacted with, e.g., appropriate acid or base 24 to adjust the pH to a desired pH, e.g., a pH at about the original level, water is removed 26 from the slurry and decontaminated soil 28 is returned to a desired location.

The magnet for the present separation process can generally be a resistive magnet or superconducting electromagnet, preferably a superconducting electromagnet. The magnetic field produced by the magnet is a strong magnetic field, i.e., generally at least about 0.1 Tesla (T) or about 1000 Gauss. Often, higher strength magnetic fields of at least about 2 T up to about 8 T or greater are desired to improve the separation efficiency. However, with some admixtures, e.g., with some soils, lower strength magnetic fields are preferred to avoid the capture of non-contaminants, i.e., materials other than actinide-containing components, by the magnetized matrix. A superconducting electromagnet is needed to obtain strong magnetic fields of at least about 8 T. The magnetic field can be oriented either parallel or perpendicular to the direction of slurry flow. A solenoid type magnet having an axial field in relation to the slurry flow is generally preferred to a cross field magnet.

The matrix material within the magnetized volume of the magnet can generally be any ferromagnetic material preferably a metal having a fine element size and an enhanced surface area such as steel wool, steel felt metal, steel balls, nickel foam, a 50% iron and 50% nickel matte, expanded metal mesh and the like. By the term "steel" is meant any variety of steel including, e.g., stainless steel. If ordinary steel is used it could need to be coated with a suitable material adapted to protect the ordinary steel from water in the slurry. One preferred orientation of the matrix material is in the form of stacked disks parallel to the flow of the slurry, i.e., a form of parallel plates of expanded metal.

Desired packing densities of the matrix material with, e.g., expanded metal can be, e.g., from about 5 percent to about 10 percent matrix material, the remainder being the void fraction. An optimal packing density may be found for varying soil or slurry compositions. The trade-off is between packing density initially leading to greater separations until even greater packing densities lead to clogging problems.

In the present process, the matrix material is generally pretreated prior to the magnetic separation. Such pretreatment can involve treatment with water and any surfactant added to, e.g., the soil slurry.

The canister containing the matrix material can allow for either radial or axial flow through the canister, preferably for axial flow. A canister system can be employed wherein the canister is maintained within the magnetic field and then moved out of the field for separation of the captured material. Also, a dual canister system can be employed wherein a second canister containing the matrix material is exchanged or replaced within the field. At the time that a canister is outside the magnetic field, the canister can be rinsed or flushed to remove adhered material, such as actinide particles, from the canister. The canister can be made of any suitable material such as aluminum, non-ferromagnetic or austenitic stainless steel or plastics, preferably non-ferromagnetic stainless steel or plastics.

In FIG. 2, a schematic of such a canister system 40 is shown. The canister system includes a stainless steel canister 42, adjustable in length. The canister holds a cylindrical-shaped, loosely packed ferromagnetic matrix 44, either 10.1 or 30.5 cm in length (1.5 or 4.4 liters volume, respectively). The matrix is contained within the canister housing 46. A central pipe 48 extends beyond the length of the canister system, well outside of the magnet 50. In the case of a superconducting electromagnet magnet 50 is cooled by coolant 52, e.g., liquid helium. The slurry exits the canister after passing through the matrix through a second pipe 54 extending outside of the magnet. This arrangement allows one to pump the slurry through the matrix in one direction when the canister is positioned within the magnetic field and then to reverse the flow thereby back-flushing the contaminants out of the matrix when the canister is out of the magnetic field. During back-flush, the addition of air sparging leading to a bubble liquid mixture is believed to optimize removal of contaminants. Such air sparging can involve rapidly alternating the introduction of water and air as the backflush material. Also shown is coolant 56 which may be, e.g., liquid nitrogen.

One additional part of the canister system can be the inclusion of thin magnetic stainless steel sleeves at the ends of the canister where the ferromagnetic material is absent. The stainless steel tube supporting the canister can also be filled with a dummy ferromagnetic matrix at the same packing density as the active ferromagnetic matrix to avoid the generation of stresses in the magnetic coil when the canister train is raised and lowered inside the magnet bore.

As most soils can contain up to about 5 percent of a highly magnetic component, most typically iron oxides, the actinide-containing soil can optionally be passed through a low field intensity magnet to separate a substantial portion of the highly magnetic component within the soil prior to the magnetic separation of the weakly magnetic actinide component. The low field intensity magnet can be a permanent magnet or an electromagnet.

The soil/water slurry generally can include additives such as a surfactant adapted for promoting a dispersion of the soil particles in the slurry, a surfactant adapted for reducing foaming, and sufficient pH adjusting material, e.g., base or acid, to generate a desired pH range, e.g., a pH of from about 2 to about 10 within the slurry. The surfactant for promoting dispersion of the particles can be, e.g., sodium pyrophosphate, sodium hexametaphosphate, sodium silicate, sodium polyacrylate or an alkyl aryl polyether such as Triton CF-10 TM. The dispersion-promoting surfactant is generally added in amounts from about 0.05 weight percent to about 2 weight percent based on the total weight of the slurry, preferably from about 0.05 weight percent to about 0.2 weight percent based upon the total weight of the slurry. An additive for reducing foam can be, e.g., any suitable surfactant or isopropanol. The foam reducing agent is generally added in amounts from about 0.05 weight percent to about 2 weight percent based on the total weight of the slurry, preferably from about 0.3 weight percent to about 0.8 weight percent based upon the total weight of the slurry.

The slurry composition can generally include a liquid, preferably water, and from about 0.1 percent up to about 30 percent by weight solids content, more usually from about 5 percent up to about 15 percent by weight solids content.

To improve the separation of the actinide-containing components from soil, it is generally preferred to treat the feed soil by, e.g., grinding and sizing the soil to remove stones and break-up any soil aggregates. The soil may be particle sized by, e.g., sieving or wet classification to obtain a desired particle size range for processing with magnetic separation.

The flow of the slurry through the matrix material subjected to the magnetic field can generally be in an suitable direction, e.g., vertically, i.e., upwards or downwards, or horizontally. The flow rate of the slurry through the matrix material subjected to the magnetic field can generally be at a rate sufficient to yield a liquid velocity, i.e., a superficial flow velocity, of from about 0.1 centimeters per second to about 10 centimeters per second.

After operation of the present magnetic separation process, water from the slurry can be separated from the soil and if desired recycled to form additional slurry. The separated soil may then be returned to its original environment.

The present invention is more particularly described in the following examples which are intended as illustrative only, since numerous modifications and variations will be apparent to those skilled in the art.

EXAMPLE 1

35 grams (g) of illite-beidellite clay was dispersed in 315 cubic centimeters (cc) of water that was 0.2 percent by weight in sodium hexametaphosphate. A small quantity of plutonium oxide particles in the two to five micron size range was added to the clay slurry and mixed for 0.5 hours. The initial radioactivity (Pu-alpha activity) of the slurry was about 1500 pCi/g.

This slurry was pumped through an aluminum canister containing expanded metal matrix material. The process flow rate was about 80 cc/minute thereby yielding a superficial velocity of about 1.0 centimeter/second (cm/sec). The magnetic field was 2 Tesla. The decontaminated slurry was collected, sampled and passed through the canister a second time. The resultant clay, after drying, was determined to contain about 4 pCi/g of radioactivity.

Although the present invention has been described with reference to specific details, it is not intended that such details should be regarded as limitations upon the scope of the invention, except as and to the extent that they are included in the accompanying claims.

What is claimed is:

1. A process of separating actinide-containing components from an admixture comprising:

forming a slurry including actinide-containing components within an admixture, said slurry including a dispersion-promoting surfactant;

adjusting the pH of said slurry to within a pH range of from about 2 to about 10; and, passing said slurry through a matrix material, said matrix material adapted to generate high magnetic field gradients upon the application of a strong magnetic field exceeding about 0.1 Tesla whereupon a portion of said actinide-containing components are separated from said slurry and remain adhered upon said matrix material.

2. The process of claim 1 wherein said admixture including said actinide-containing components is soil.

3. The process of claim 2 further including subjecting said slurry to comminution for sufficient time to reduce agglomeration of soil within said slurry prior to passage through said matrix material.

4. The process of claim 1 wherein said admixture including said actinide-containing component is storage tank waste.

5. The process of claim 1 further including passing said slurry past a low field magnet adapted for separation of a portion of highly magnetic material contained within said slurry prior to passing said slurry through said matrix material.

6. The process of claim 2 further including passing said slurry past a low field magnet adapted for separation of a portion of highly magnetic material contained within said slurry prior to passing said slurry through said matrix material.

7. The process of claim 1 further including separating a portion of water from said slurry at a time after said slurry is passed through the strong magnetic field.

8. The process of claim 1 further including periodically separating actinide-containing components from said matrix material.

9. The process of claim 1 wherein the matrix material is expanded metal mesh.

10. The process of claim 2 wherein the matrix material is expanded metal mesh.

* * * * *